April 25, 1961 A. M. SEVERSON 2,981,868
ELECTRICAL APPARATUS
Filed Aug. 8, 1957 3 Sheets-Sheet 1

INVENTOR.
ASBJORN M. SEVERSON
BY Warren A. Sturm
ATTORNEY

INVENTOR.
ASBJORN M. SEVERSON

BY Warren A. Sturm

ATTORNEY

April 25, 1961 A. M. SEVERSON 2,981,868

ELECTRICAL APPARATUS

Filed Aug. 8, 1957 3 Sheets-Sheet 3

INVENTOR.
ASBJORN M. SEVERSON
BY Warren A. Sturm
ATTORNEY 2,981,868

ELECTRICAL APPARATUS

Asbjorn M. Severson, Minneapolis, Minn., assignor to Minneapolis-Honeywell Regulator Company, Minneapolis, Minn., a corporation of Delaware Filed Aug. 8, 1957, Ser. No. 677,112

3 Claims. (Cl. 317—101)

This invention relates to a method of making electrical apparatus and is more particularly directed to the method of making unitary electrical apparatus having three dimensional circuitry.

Electrical apparatus, such as amplifiers, power supplies and other apparatus apparent to those skilled in the art, is presently manufactured by placing components on a chassis so as to utilize production line methods. This system is costly and inefficient due to the labor costs of skilled workers, scrap, breakage and other problems.

My invention eliminates this costly method by the substitution of a method in which relatively inexpensive materials and unskilled labor may be used. Furthermore, the construction of electrical apparatus by the method of my invention is well adapted to production line techniques.

One of the objects of my invention is to provide a method of manufacturing electrical apparatus which eliminates expensive soldering operations.

Another object of my invention is to provide a method of producing electrical apparatus whereby the components used in the apparatus are substantially free of the danger of overheating as in ordinary solder operations.

Another object of my invention is to provide a method of manufacturing electrical apparatus which eliminates the need for highly skilled labor.

Another object of my invention is to provide a method of manufacturing electrical apparatus which permits the use of inexpensive materials.

Still another object of my invention is to provide a method whereby a three dimensional circuit is provided by an arrangement of superimposed insulating layers, having material removed therefrom, electrical components contained therein and electrically conductive material connecting said components in circuits.

A further object of my invention is the method of producing electrical apparatus that includes a plurality of insulating layers and spacers in which the insulating spacers contain electrically conductive material and in which the layers and spacers form a unitary electrical device.

These and other objects of my invention will be more fully understood by reference to the attached drawings in which.

Figures 1, 1B:
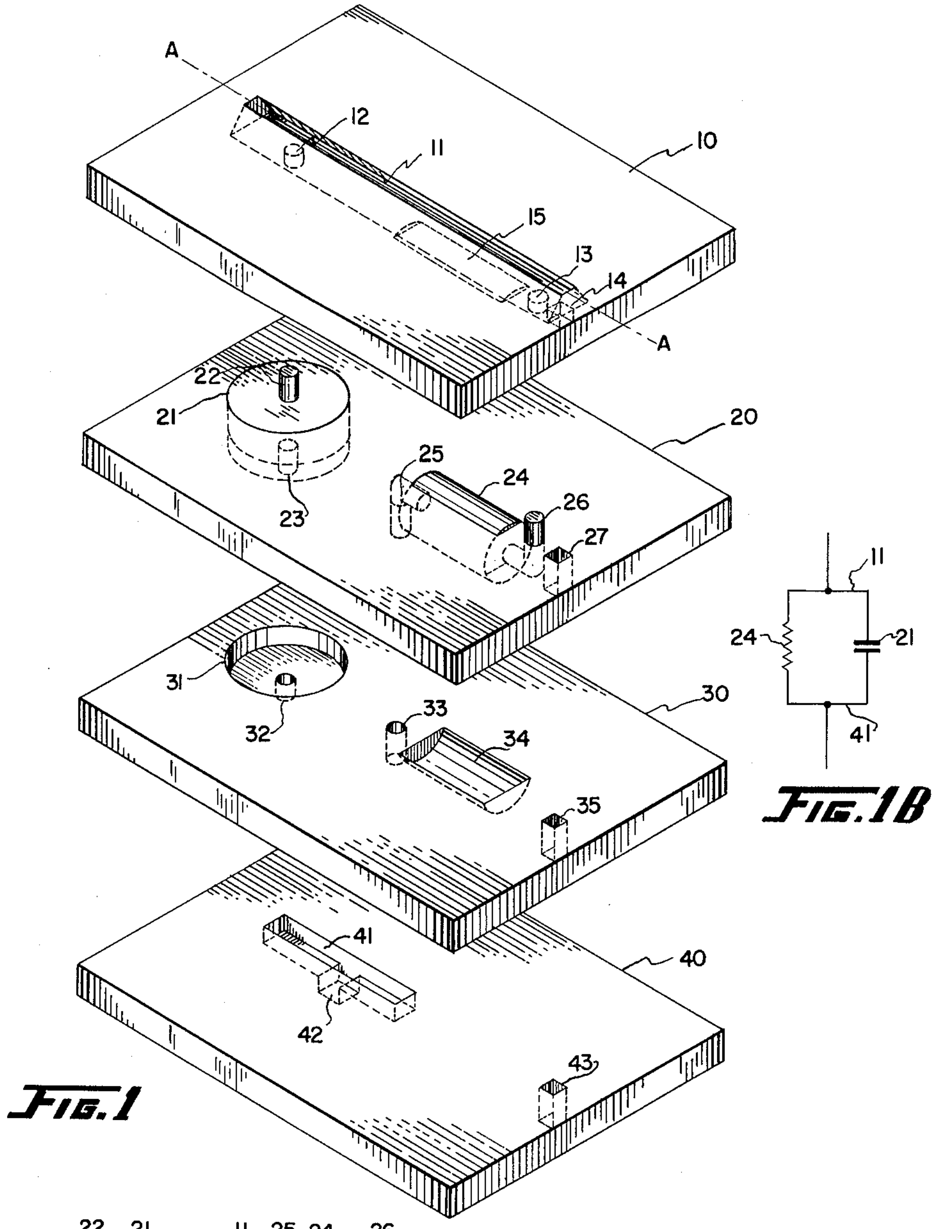
Figure 1 is an exploded perspective view of an embodiment of my invention having a plurality of insulating layers including electrical components and interconnecting channels imbedded therein.
Figure 1B is a schematic diagram of the circuit of Figure 1.

Referring now to Figure 1, this embodiment includes insulating layers 10, 20, 30 and 40, a capacitor 21, and a resistor 24. Certain characteristics may be desirable in the material used for the above mentioned insulating layers. Among these characteristics are: good molding and machining characteristics, low cost, resiliency, impermeability to molten metal but permeable to air, good electrical properties, and the ability to withstand high temperatures momentarily. I have found that filled phenolic resins and moldable epoxy resins have many of these desirable characteristics and have obtained excellent results with them. Layer 10 includes a cavity 15 for the reception of a portion of resistor 24 and channel 11 which interconnects perforations 12, 13 and 14. Channel 11 is imbedded in insulating layer 10 but does not go through to the bottom surface of layer 10. Channel 11, as shown in the embodiment, is trapezoidal in cross section. It has been observed that it is desirable that the inner dimension be larger than the surface dimension. A channel having a cross sectional shape of this nature will then mechanically hold the electrically conductive material to be introduced therein as hereinafter explained with reference to Figure 2. Layer 20 includes a capacitor 21 having terminal leads 22 and 23, resistor 24 having terminal leads 25 and 26, and perforation 27. Insulating layer 30 includes cavity 31 having perforation 32 leading therefrom for the reception of capacitor 21 and capacitor terminal lead 23 respectively, cavity 34 for the reception of resistor 24, perforation 33 for the reception of resistor terminal lead 25, and perforation 35. Insulating layer 40 includes channel 41 having perforation 42 leading therefrom and a perforation 43.

A unitary electrical device can be realized by the utilization of my invention in the following manner: with the electrical components, that is capacitor 21 and resistor 24, positioned as shown and after the insulating layers 10, 20, 30 and 40 are placed in proper alignment upon one another, it is apparent that capacitor terminal lead 22 will be inserted in perforation 12 of layer 10, resistor 24 will be positioned in cavity 15 of layer 10, resistor terminal lead 26 will be positioned in perforation 13 of layer 10, and thereby capacitor terminal lead 22 and resistor terminal lead 26 will be interconnected by channel 11 of layer 10, and perforation 27 will be aligned with perforation 14. Capacitor 21 and capacitor terminal lead 23 will be positioned in cavity 31 and perforation 32, respectively, of insulating layer 30. Resistor 24 and resistor terminal lead 25 will be positioned in cavity 34 and perforation 33, respectively, of insulating layer 30 and perforation 35 will be aligned with perforation 27. Capacitor terminal lead 23 of capacitor 21 and resistor terminal lead 25 of resistor 24 are of such length that when the insulating layers 10, 20, 30 and 40 are placed in proper alignment upon one another the terminal leads will be placed in channel 41 of insulating layer 40 and perforation 43 of insulating layer 40 will be aligned with perforation 35 of insulating layer 30.

The result of the above described arrangement of materials is a system of interconnecting perforations 43, 35, 27 and 14 with channel 11 and another interconnecting system of channels and perforations composed of perforation 42 and channel 41. This arrangement is then placed in a suitable device, and electrically conductive material is introduced into the above mentioned perforations and channels thereby attaining an electrical apparatus comprised of components and interconnecting means.

Figure 1A:
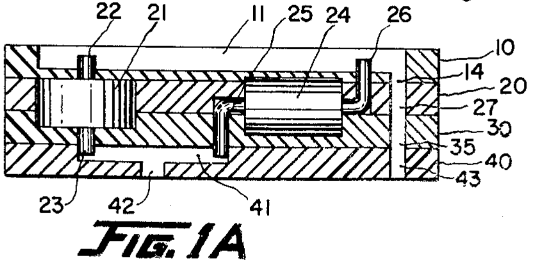
Figure 1A is a sectional view of Figure 1 taken along the indicated line A—A of Figure 1.

A sectional view along the line A—A of the apparatus of Figure 1 is shown in Figure 1A, components having like numbers in Figure 1A indicating like components of Figure 1. Insulating layers 10, 20, 30 and 40 with perforations 14, 27, 35, and 43 respectively are shown in proper alignment and ready for the introduction of electrically conductive material through perforations 42 and 43. Introduction of electrically conductive material through perforation 42 will form a conductor in channel 41 thereby connecting resistor terminal lead 25 with capacitor terminal lead 23. Introduction of electrically conductive material through opening 43 will form a conductor in channel 11 thereby connecting resistor terminal lead 26 with capacitor terminal lead 22.

After the electrical apparatus described above is placed in a suitable device to introduce electrically conductive material, I have found that the air entrapped in the channels and perforations escapes through the permeable insulating layers thus permitting the electrically conductive material to completely fill the channels and perforations.

Shown in Figure 1B is an electrical schematic of the arrangement shown in Figure 1 in which resistor 24 and capacitor 21 are connected by the electrically conductive material placed in channels 11 and 41.

Figure 2:
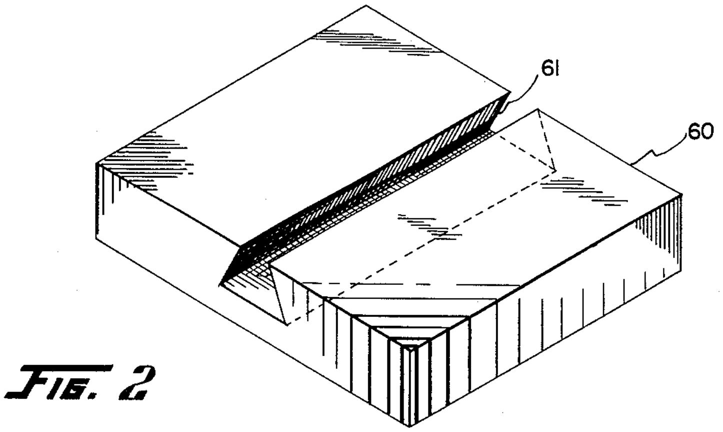
Figure 2 is a perspective view of an insulating layer preformed to enable a conductor to be imbedded and mechanically held therein.

In Figure 2, I have shown the construction of the channel 61 in an insulating layer 60 which might for example, be used in an assembly of Figure 1. If the channel 61 is constructed such that the inner dimension is larger than the surface dimension, the shape of the channel will be such that when the electrically conductive material is placed therein, it will be mechanically held by the insulating layer. If the electrically conductive material were to be metal, it will be apparent that the metal upon cooling in the layer will contract and become loose fitting. The overhanging edges of channel 61 will then hold the metal in position. It is to be understood that the trapezoidal construction shown in Figure 2 is not the only geometric configuration that will satisfy the requirements of having the inner dimension larger than the surface dimension. For example, a portion of a cylindrical shape could be utilized as well.

Figure 3:
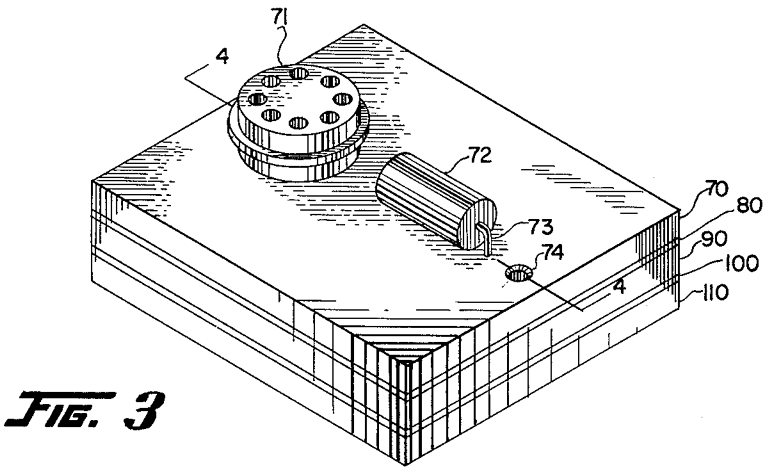
Figure 3 is a perspective view of a modification of my invention comprising a plurality of superimposed insulating layers having electrical components positioned thereon and electrical conductors imbedded in each insulating layer.

In Figure 3, I have shown a further embodiment of my invention composed of insulating layers 70, 80, 90, 100 and 110. Insulating layers 70, 90 and 110 are of one type of material and layers 80 and 100 are of another type of material. I have found that if layers of a non-resilient nature for example, layers 70, 90 and 110 of Figure 3 are placed together it may be difficult to prevent leakage of the electrically conductive material introduced into the channels. I have also found that separating the non-resilient insulating layers by means of permeable resilient insulating spacers for example, layers 80 and 100 of Figure 3 substantially eliminates this leakage. In addition in Figure 3 there is shown a tube socket 71, a resistor 72 having resistor terminal lead 73 and a tapered opening 74.

Figure 4:
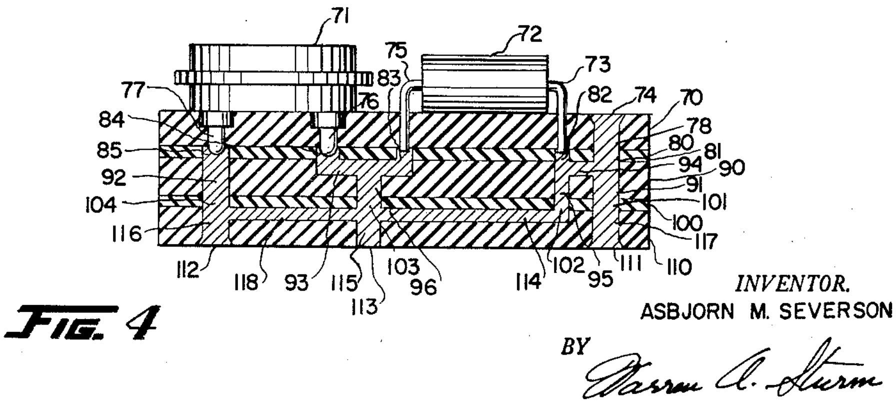
Figure 4 is a sectional view of Figure 3, taken along the indicated line 4—4 of Figure 3 showing interconnecting electrical conductors imbedded in each insulating layer and the electrical components positioned thereon.

Figure 4 is a sectional view of Figure 3 taken along the line 4—4 of Figure 3, components having like numbers in Figure 4 indicating like components of Figure 3. The insulating layers and insulating spacers, as shown in Figure 4, have been preformed by suitable means such as machining, molding or other means obvious to those skilled in the art to form interconnecting channels and perforations. The introduction of electrically conductive material into said channels and perforations produces an electrical apparatus comprised of components and interconnecting means as described below. To facilitate the explanation of Figure 4 I have divided the interconnecting means into sections of conductors individually enumerated, although it is to be understood that the combination of the individual sections may form one interconnecting means. Insulating layer 70, having tapered section 74, has positioned thereon tube socket 71 and resistor 72. Tube socket solder lugs 76 and 77 protrude through insulating layer 70 and connect with conductors 84 and 85 in spacer 80 respectively. Resistor terminal leads 73 and 75 protrude through insulating layer 70 and connect with conductors 82 and 83 in spacer 80 respectively. Conductor 78, inbedded in insulating layer 70, connects with the electrically conductive material introduced in tapered section 74 and also with conductor 81 imbedded in resilient insulating spacer 80. Conductor 81 in spacer 80 also connects with conductors 91 and 94 imbedded in insulating layer 90. Conductor 101 in spacer 100 interconnects conductor 91 in layer 90 and conductor 117 in layer 110. Conductor 117 also connects with the electrically conductive material in tapered section 111. Conductor 95 in layer 90 interconnects conductor 94 in layer 90 and conductor 114 in layer 110. Conductor 96 in layer 90 interconnects conductor 93 in layer 90 and conductor 103 in spacer 100. Conductor 103 is connected to conductors 114 and 118 in layer 110 by means of conductor 115 in layer 110. Conductor 92 in layer 90 interconnects conductor 85 in spacer 80 and conductor 104 in spacer 90. Conductor 116 in layer 110 interconnects conductor 104 in spacer 90 and conductor 118 in layer 110 with the electrically conductive material in tapered section 112 in layer 110.

The introduction of electrically conductive material through opening 113 forms the above mentioned conductors which in combination with each other form the interconnecting means. If the electrically conductive material is, for example, molten metal, tapered sections 74 and 111, in conjunction with the conductors therebetween, not only form electrical connections but also bind the insulating layers together when the molten metal cools and thereby contracts. Tapered section 112 also serves the purpose of binding the insulating layers together.

Although insulating spacers 80 and 100 are shown in this figure, they would not be necessary if the insulating layers 70, 90 and 110 were of a suitable resiliency and permeability. Some resiliency and permeability may be desired in producing a device of this type to prevent the leakage of metal. If the layers 70, 90 and 110 are of non-resilient material, insulating spacers 80 and 100 are placed in such a fashion as to separate the non-resilient insulating layers to prevent leakage of metal in an undesired manner. I have also found that in the embodiment of my invention disclosed in Figure 4 that the air entrapped in the channels and perforations escapes through the permeable material.

Figure 5:
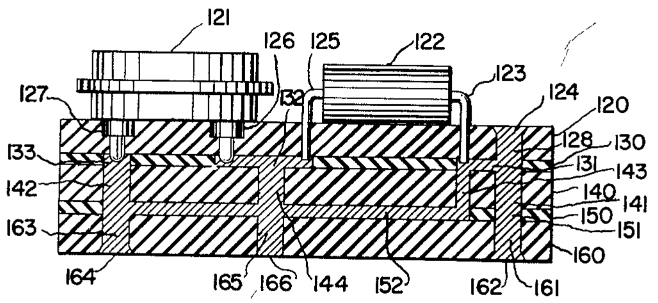
Figure 5 is a sectional view of another modification of my invention having a plurality of superimposed insulating layers with insulating spacers therebetween showing the interconnecting electrical conductors imbedded in the insulating spacer and insulating layers.

Figure 5 is a further embodiment of my invention in which a method of making a unitary electrical device including electrical components, insulating layers, insulating spacers and electrically conductive material, is shown. The insulating layers and insulating spacers shown in Figure 5 have been preformed by suitable means such as machining, molding, stamping or other means obvious to those skilled in the art to form channels and perforations. The introduction of electrically conductive material into said channels and perforations produces an electrical apparatus comprised of components and interconnecting means as described below. Also note that in Figure 5 the majority of the interconnecting means are placed in the insulating spacers. The insulating spacers are more easily preformed than the insulating layers. For example, the insulating spacers may be thinner than the insulating layers and may be easily preformed by a stamping operation whereas the insulating layers might be preformed by more expensive machining operations. It is desirable that the insulating spacers be permeable and more resilient than the insulating layers to aid in preventing the leakage of the electrically conductive material through the apparatus in an undesired manner. The air entrapped in the apparatus at the time of the introduction of the electrically conductive material, escapes through the perforations into which the component terminal leads are inserted and through the permeable material. To facilitate the explanation of Figure 5, the interconnecting means are divided into sections or conductors individually enumerated, although it is to be understood that the combination of the indvidual sections forms one interconnecting means. Insulating layer 120, having tapered section 124, has positioned thereon tube socket 121 and resistor 122. Tube socket solder lugs 126 and 127 protrude through insulating layer 120 and connect with conductors 132 and 133 respectively, said conductors being formed in resilient insulating spacer 130. Resistor terminal leads 123 and 125 protrude through insulating layer 120 and connect with conductors 131 and 132 in spacer 130 respectively. Thus, resistor terminal lead 125 is connected to tube socket solder lug 126 by means of conductor 132. Conductor 128 in layer 120 interconnects the electrically conductive material in tapered section 124 with conductor 131 in layer 130. Conductor 141, formed in insulating layer 140, interconnects conductor 131 with conductor 151 formed in insulating spacer 150. Conductor 161 in layer 160 interconnects conductor 151 in spacer 150 with the electrically conductive material in tapered section 162 of insulating layer 160. Conductor 143 in layer 140 interconnects conductors 131 and 152 in spacer 150. Conductor 152 interconnects conductor 144 in layer 140 with conductor 165 in layer 160 which in turn is connected to an opening 166 in layer 160. Conductor 152 further interconnects conductor 142 in layer 140 which in turn connects with conductor 133 in spacer 130, and conductor 163 in layer 160 which is connected to the electrically conductive material in tapered section 164 in layer 160. The introduction of electrically conductive material through opening 166 forms the above mentioned conductor sections which, in combination with each other, form the interconnecting means. If the electrically conductive material is, for example, molten metal the tapered sections shown in Figure 5 perform the same functions as the tapered sections described in Figure 4.

Figure 6:
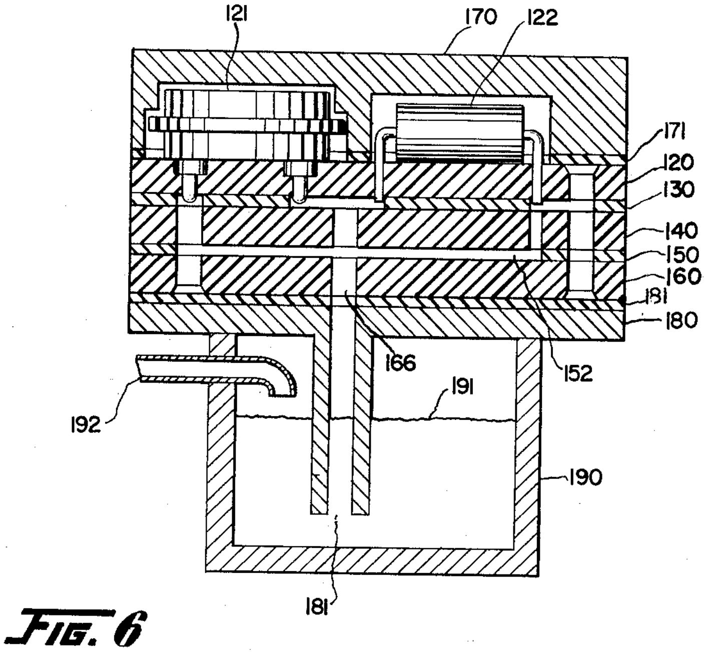
Figure 6 is a sectional view of the apparatus shown in Figure 5 positioned in a device suitable to introduce electrically conductive material into the interconnecting channels.

Shown in Figure 6, is one method of introducing the electrically conductive material into the unitary electrical apparatus shown in Figure 5. The apparatus shown in Figure 5 is placed in the device shown in Figure 6 wherein components having like numbers in Figure 6 indicate like components of Figure 5. In addition, as shown in Figure 6, a platen 170 to which pressure can be applied is positioned upon a resilient, permeable layer 171 which is positioned upon insulating layer 120. Insulating layer 160 is positioned upon a resilient, permeable layer 181 which is positioned upon platen 180 so as to align opening 166 of insulating layer 160 with opening 181 of platen 180. Platen 180 is positioned upon crucible 190 which contains molten metal 191 and is heated by suitable means to keep the metal in a molten state. Tube 192 is tightly fitted in crucible 190 and is connected by suitable means to an external pressurized gas supply.

The operation of the device shown in Figure 6 is as follows: the apparatus composed of insulating layers, insulating spacers and electrical components is positioned between platens 170 and 180. Pressure is applied to the bottom of the crucible 190 and the top of platen 170. Pressurized gas is then passed through tube 192 which exerts pressure upon the molten metal 191. This pressure then forces molten metal up through opening 181 and opening 166 to the interconnecting channels. The air entrapped in the apparatus and device shown in Figure 6 escapes through the permeable insulating layers and insulating spacers and through the perforations containing the component terminal leads.

In one embodiment of my invention, I have found that nitrogen gas is an excellent means for applying pressure to the molten metal due to the inert qualities of the nitrogen gas. The metal I have used and obtained excellent results with is a combination of lead and antimony composed of 94% lead and 6% antimony. This metal was kept at a constant temperature of approximately 1100 degrees Fahrenheit and was injected into the insulating material at a pressure of 600 p.s.i.

I have found that under some circumstances it may be desirable to break one or more of the interconnecting conductors to obtain a different circuit. This may be done for example, by drilling through the insulating layers and insulating spacers to break the circuit at the desired point. It may also be desirable to protect the completed apparatus from external short circuits, moisture, corrosion etc. This may be done by spraying the apparatus with insulating lacquer or other means obvious to those skilled in the art.

While various embodiments have been shown to describe my invention, it is understood that modifications may be made without departing from the spirit of the invention.

What I claim as my invention is:

1. A unitary electrical device embodying a three dimensional electrical circuit and comprising a plurality of insulating layers separated by an insulating spacer of resilient, porous material extending laterally between said insulating layers into contact with the surrounding atmosphere, a plurality of cast conductors extending through channels in said layers and spacer, and electrical components having terminals integrally joined with said conductors, said conductors being confined within said channels by reason of the resiliency of said spacer preventing leakage of the conductive material during the casting thereof and said conductors being substantially free of air pockets by reason of the porosity of said spacer providing for the escape of air from said channels through said spacer to the surrounding atmosphere as the conductive material is being introduced into said channels.

2. A method of producing a unitary electrical device embodying a three dimensional electrical circuit and comprising a plurality of insulating layers and insulating spacers and having electrical conductors positioned therein with electrical components connected thereto which comprises the steps of: forming a plurality of insulating layers having a plurality of perforations and channels according to a predetermined pattern; providing a resilient air-permeable insulating spacer with perforations and channels according to said predetermined pattern; sandwiching said spacer between two of said layers so as to form a unitary structure having a plurality of channels interconnecting with each other and having said porous spacer extending outwardly into contact with the surrounding atmosphere, adding electrical components having terminals with the terminals of said components communicating with said channels; and introducing an electrically conductive material in liquid state into said channels, forcing the air in said channels out through the porous spacer to the surrounding atmosphere as the conductive material fills said channels while preventing, because of the resiliency of said spacer material, any leakage of said conductive material beyond the confines of said predetermined pattern, and causing said conductive material to harden.

3. A method of producing a unitary electrical device embodying a three dimensional electrical circuit and comprising a plurality of insulating layers and insulating spacers and having electrical conductors positioned therein with electrical components connected thereto which comprises the steps of: forming at least three insulating layers having a plurality of perforations and channels according to a predetermined pattern; providing a plurality of resilient air-permeable insulating spacers with perforations and channels according to said predetermined pattern; sandwiching said spacers between each of said layers so as to form a unitary structure having a plurality of cavities and channels interconnecting with each other and with said cavities and having said porous spacers extending outwardly into contact with the surrounding atmosphere, inserting electrical components having terminals into said cavities with the terminals of said components communicating with said channels; and introducing an electrically conductive material in liquid state into said channels, forcing the air in said channels out through the porous spacers to the surrounding atmosphere as the conductive material fills said channels while preventing, because of the resiliency of said spacer material, any leakage of said conductive material beyond the confines of said predetermined pattern, and causing said conductive material to harden.

References Cited in the file of this patent

UNITED STATES PATENTS

| | | |
|---|---|---|
| 2,512,162 | Lips | June 20, 1950 |
| 2,613,252 | Heibel | Oct. 7, 1952 |
| 2,695,351 | Beck | Nov. 23, 1954 |

FOREIGN PATENTS

| | | |
|---|---|---|
| 129,601 | Australia | Oct. 25, 1948 |
| 953,590 | France | Dec. 8, 1949 |